United States Patent
Chen et al.

(10) Patent No.: US 9,543,864 B1
(45) Date of Patent: Jan. 10, 2017

(54) MOTOR DRIVING CIRCUIT WITH POWER REVERSAL PROTECTION AND FAN DEVICE

(71) Applicant: ANPEC ELECTRONICS CORPORATION, Hsinchu (TW)

(72) Inventors: Kun-Min Chen, Hsinchu (TW); Chien-Lun Chu, Kaohsiung (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/878,599

(22) Filed: Oct. 8, 2015

(30) Foreign Application Priority Data

Jul. 1, 2015 (TW) .............................. 104121340 A

(51) Int. Cl.
*H02H 7/08* (2006.01)
*H02P 6/12* (2006.01)
*H02P 6/16* (2016.01)

(52) U.S. Cl.
CPC .. *H02P 6/12* (2013.01); *H02P 6/16* (2013.01)

(58) Field of Classification Search
CPC ........................................................ H02P 6/14

USPC ................................ 318/400.21, 400.01, 700
See application file for complete search history.

(56) References Cited

U.S. PATENT DOCUMENTS 7,049,767 B2 * 5/2006 Wilhelm ............... H02M 7/538
  315/209 R

* cited by examiner

*Primary Examiner* — David S Luo
(74) *Attorney, Agent, or Firm* — Li & Cai Intellectual Property (USA) Office

(57) ABSTRACT

A motor driving circuit with power reversal protection and a fan device are disclosed. The motor driving circuit has a supply end and a ground end. A reversal protection circuit is configured in the motor driving circuit and is electrically connected to the supply end. When a power line and a ground line of a power supply electrically and respectively connect to the supply end and the ground end (indicating a correct connection condition), the reversal protection circuit is turned on, so that the motor driving circuit receives the power transmitted from the power supply to operate. When the power line and the ground line of the power supply electrically and respectively connect to the ground end and the supply end (indicating an incorrect connection condition), the reversal protection circuit is turned off, so that the motor driving circuit does not receive the power transmitted from the power supply.

11 Claims, 4 Drawing Sheets

MOTOR DRIVING CIRCUIT WITH POWER REVERSAL PROTECTION AND FAN DEVICE

BACKGROUND

1. Technical Field

The present disclosure relates to a motor driving circuit and a fan device, in particular, to a motor driving circuit with power reversal protection and a fan device having the same.

2. Description of Related Art

A motor driver is a necessary modern industrial power transformation device. The motor is capable of transforming electricity into kinetic energy required for driving devices. Conventional motors include DC motors, AC motors, stepping motors, and etc. Motors are often applied to drive one element of the electronic device, for example, blades of the fan device are usually rotated with the motor. Therefore, how to design an efficient motor has become a major objective in the industry. The motor driving circuit is constituted by a stator and a rotor configured opposite to each other. The rotor can rotate with respect to the stator to operate the motor by the magnetic force and magnetic field change, so that the fans configured on the motor are rotated.

Generally speaking, the conventional motor driving circuit has a supply end and a ground end. A power line of a power supply is electrically connected to the supply end, and a ground line of the power supply is electrically connected to the ground end, so that the power supply transmits the power to the motor driving circuit for driving through the supply end, and then operates the motor.

However, when the power line and the ground line of the power supply are connected in reverse, i.e., the ground line electrically connects to the supply end and the power line electrically connects to the ground end, the power supply transmits the power to the motor driving circuit through the ground end, so that the diode of the motor driving circuit is forward biased, to burn out the power supply.

Therefore, if the motor driving circuit can provide a protection mechanism to avoid burning out the power supply when the power line and the ground line of the power supply are connected in reverse, the life time of the power supply can be increased.

SUMMARY

An exemplary embodiment of the instant disclosure provides a motor driving circuit with power reversal protection. The motor driving circuit is adapted for driving a motor. The motor driving circuit includes a full bridge circuit, a control circuit, and a reversal protection circuit. The full bridge circuit is electrically connected between the motor and a ground end. The control circuit is electrically connected to the full bridge circuit. The control circuit is configured for controlling the phase commutation of the full bridge circuit according to two hall signals, to generate a plurality of driving voltage signals in the full bridge circuit and to accordingly control the operation of the motor. The reversal protection circuit is electrically connected among a supply end, the full bridge circuit, and the control circuit. The reversal protection circuit includes a laterally diffused metal oxide semiconductor (LDMOS), a voltage pull-down element, and a clamp element. The LDMOS has a drain end, source end, and a gate end. The drain end is electrically connected to the supply end, and the source end is electrically connected to the full bridge circuit. The voltage pull-down element is electrically connected between the gate end and the ground end, and is used for decreasing the voltage of the gate end. The clamp element is electrically connected between the gate end and the full bridge circuit, and is used for limiting the voltage of the gate end to being above a clamp voltage. Therefore, the voltage difference between the source end and the gate end is less than a predefined low voltage. When the supply end is connected to ground through a ground line of a power supply and the ground end receives a power generated from a power line of the power supply, the voltage difference between the source end and the gate end is less than a turn-on voltage, to turn off the LDMOS.

An exemplary embodiment of the instant disclosure provides a fan device. The fan device includes a blade, a motor, and a motor driving circuit. The motor configures the blade, and drives the blade to rotate. The motor driving circuit is electrically connected to the motor. The motor driving circuit includes a full bridge circuit, a control circuit, and a reversal protection circuit. The full bridge circuit is electrically connected between the motor and a ground end. The control circuit is electrically connected to the full bridge circuit, and configured for controlling the phase commutation of the full bridge circuit according to two hall signals, to generate a plurality of driving voltage signals in the full bridge circuit and to accordingly control the operation of the motor. The reversal protection circuit is electrically connected among a supply end, the full bridge circuit, and the control circuit. The reversal protection circuit includes a LDMOS, a voltage pull-down element, and a zener diode. The LDMOS has a drain end, source end, and a gate end. The drain end is electrically connected to the supply end, and the source end is electrically connected to the full bridge circuit. The voltage pull-down element is electrically connected between the gate end and the ground end, and is used for decreasing the voltage of the gate end. The zener diode has an anode end and a cathode end. The anode end is connected to the gate end, and the cathode end is connected to the full bridge circuit. The zener diode is used for limiting the voltage of the gate end to being above a clamp voltage, so that the voltage difference between the source end and the gate end is less than a predefined low voltage. When the supply end is connected to ground through a ground line of a power supply and the ground end receives a power generated from a power line of the power supply, the voltage difference between the source end and the gate end is less than a turn-on voltage, to turn off the LDMOS.

To sum up, the exemplary embodiments of the instant disclosure provide a motor driving circuit with power reversal protection and a fan device. The reversal protection circuit is configured in the motor driving circuit. Therefore, if the power line and the ground line of the power supply are connected in reverse, the reversal protection circuit configured in the motor driving circuit provides a protection mechanism to avoid burning out the power supply. The life time of the power supply can be increased.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
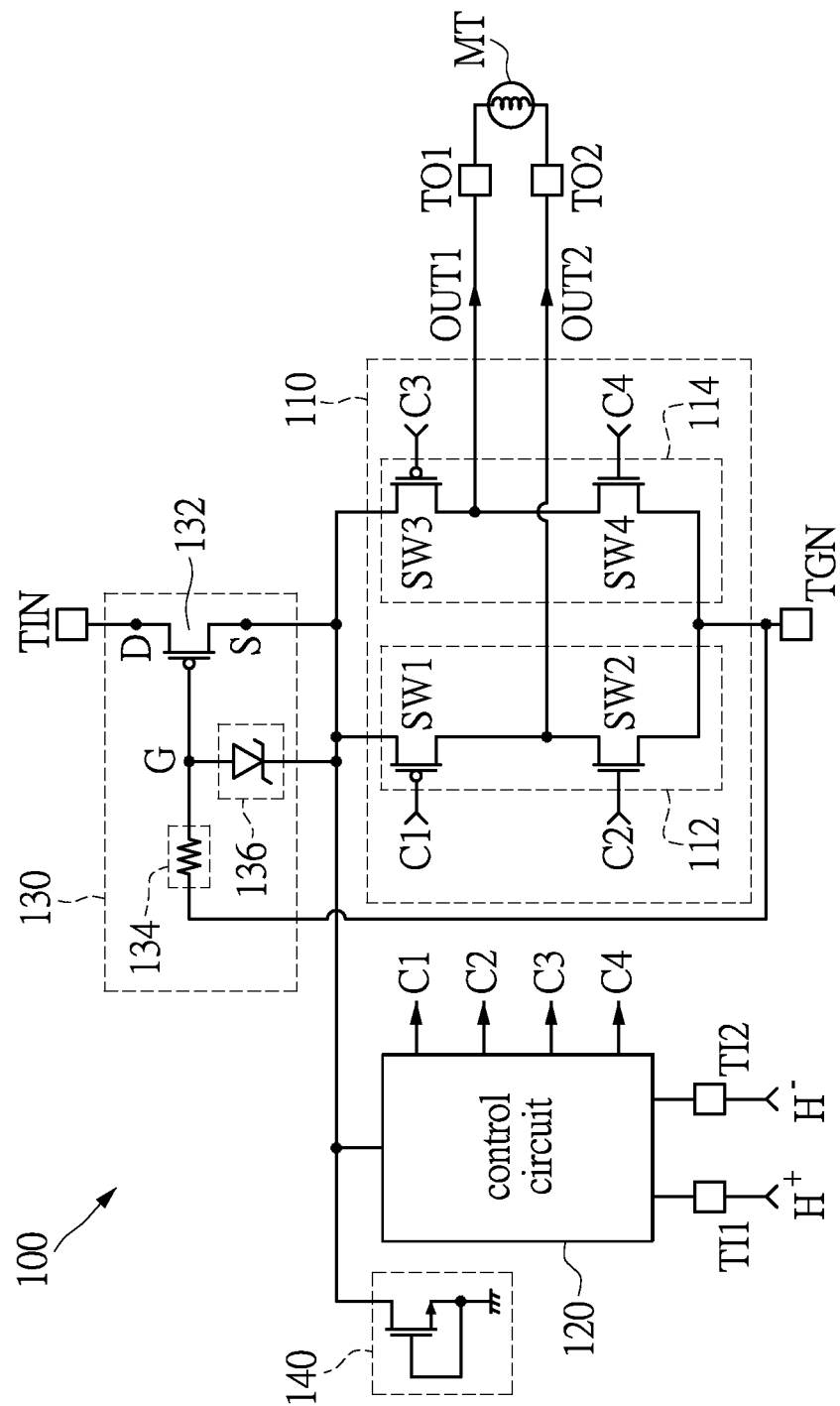
FIG. 1 shows a block diagram of a motor driving circuit according to an exemplary embodiment of the instant disclosure.

Reference will now be made in detail to the exemplary embodiments of the present disclosure, examples of which are illustrated in the accompanying drawings. Wherever possible, the same reference numbers are used in the drawings and the description to refer to the same or like parts.

This embodiment provides a motor driving circuit with power reversal protection and a fan device. The motor driving circuit has a supply end and a ground end. A reversal protection circuit is configured in the motor driving circuit and is electrically connected to the supply end. Therefore, when a power line and a ground line of a power supply electrically and respectively connect to the supply end and the ground end (indicating a correct connection condition), the reversal protection circuit is turned on, so that the motor driving circuit receives the power transmitted from the power supply to operate. When the power line and the ground line of the power supply electrically and respectively connect to the ground end and the supply end (indicating an incorrect connection condition), the reversal protection circuit is turned off, so that the motor driving circuit does not receive the power transmitted from the power supply. The motor driving circuit with power reversal protection and the fan device provided in the exemplary embodiment of the instant disclosure will be described in the following paragraph.

Firstly, please refer to FIG. 1, which shows a block diagram of a motor driving circuit according to an exemplary embodiment of the instant disclosure. As shown in FIG. 1, the motor driving circuit 100 drives a motor MT according to a stator and a rotor (not shown in FIGs) configured opposite to the motor MT. More specifically, the rotor can rotate with respect to the stator to operate the motor MT by the magnetic force and magnetic field change.

The motor driving circuit 100 includes a full bridge circuit 110, a control circuit 120, and a reversal protection circuit 130. The full bridge circuit 110 is electrically connected between the motor MT and a ground end TGN. The control circuit 120 is electrically connected to the full bridge circuit 110, and controls the phase commutation of the full bridge circuit 110 according to two hall signals H+ and H−, to generate a plurality of driving voltage signals in the full bridge circuit 110 and to accordingly control the operation of the motor MT.

Figure 2:
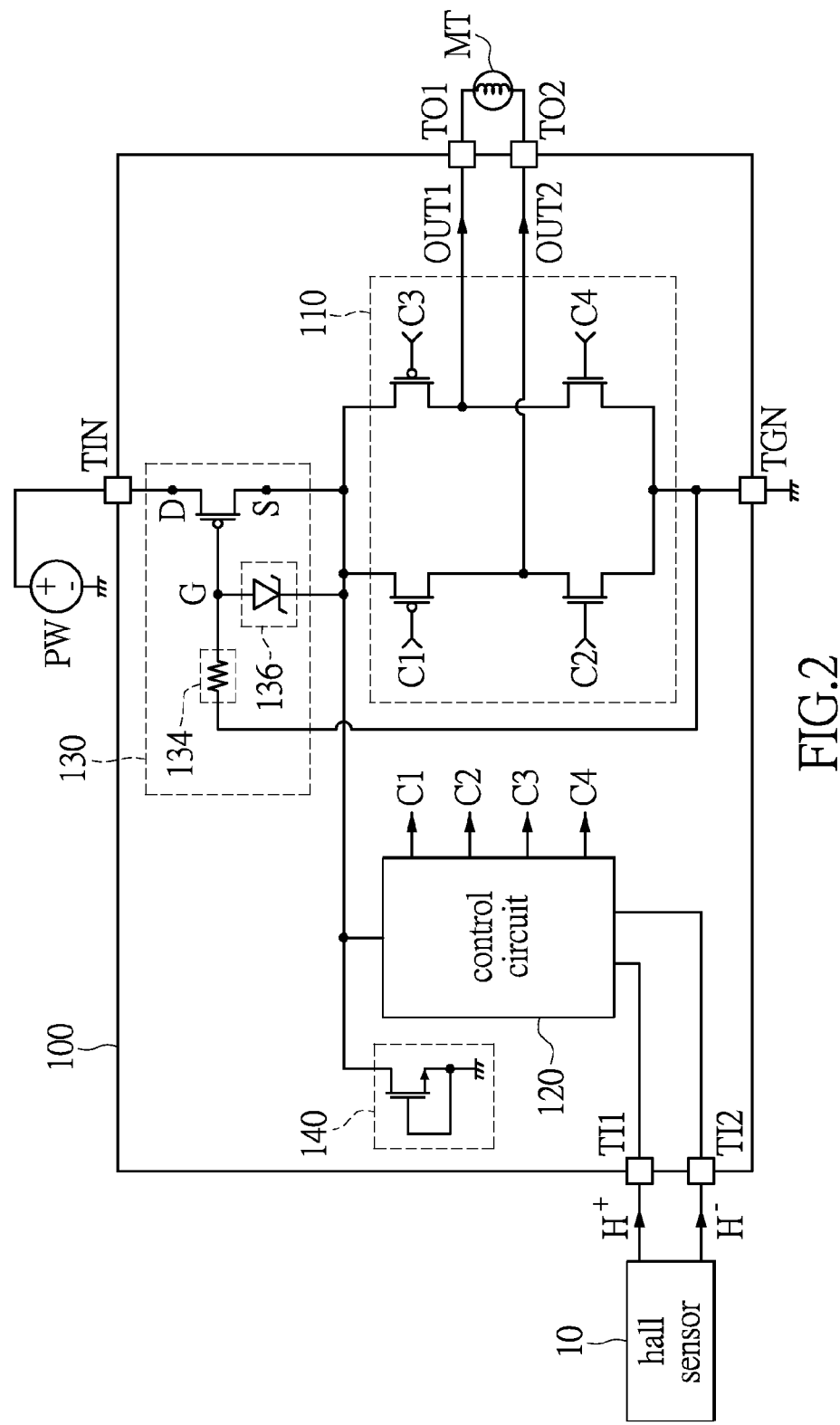
FIG. 2 shows a block diagram of a power line and a ground line of a power supply respectively connected to a supply end and a ground end according to an exemplary embodiment of the instant disclosure.
Figure 3:
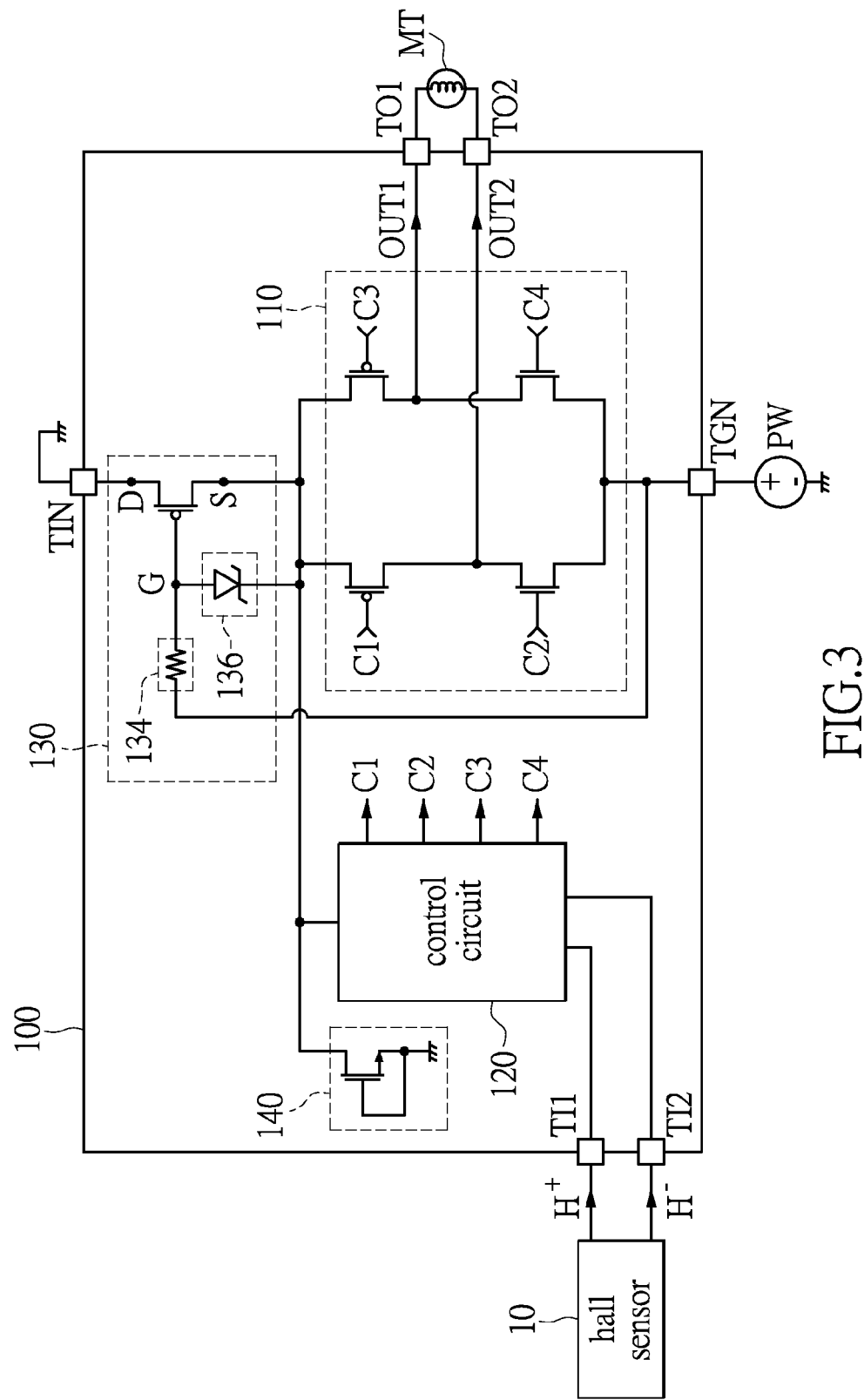
FIG. 3 shows a block diagram of a power line and a ground line of a power supply respectively connected to a ground end and a supply end according to an exemplary embodiment of the instant disclosure.

In the instant disclosure, the control circuit 120 is electrically connected to a hall sensor (e.g., the hall sensor 10 shown in FIGS. 2 and 3). The hall sensor is used for sensing magnetic field change of the motor MT in rotation, to generate two hall signals H+ and H− (the hall signal H+ and the hall signal H− are opposite). Then the hall sensor transmits two hall signals H+ and H− to the control circuit 120 through a hall positive end TI1 and a hall negative end TI2. Therefore, the control circuit 120 controls the phase commutation of the full bridge circuit 110 according to two hall signals H+ and H−, to accordingly control the operation of the motor MT.

The reversal protection circuit 130 is electrically connected among a supply end TIN, the full bridge circuit 110, and the control circuit 120. The reversal protection circuit 130 includes a LDMOS 132, a voltage pull-down element 134, and a clamp element 136. The LDMOS 132 has a drain end D, a source end S, and a gate end G. The drain end D is electrically connected to the supply end TIN, and the source end S is electrically connected to the full bridge circuit 110. The voltage pull-down element 134 is electrically connected between the gate end G and the ground end TGN, to decrease the voltage of the gate end G. In the instant disclosure, the voltage pull-down element 134 is a resistor. The resistor is electrically connected between the gate end G of the LDMOS 132 and the ground end TGN. In another disclosure, the voltage pull-down element 134 is a transistor switch. The transistor switch is electrically connected between the gate end G of the LDMOS 132 and the ground end TGN, and the control end of the transistor switch is electrically connected to the ground end TGN, to decrease the voltage of the gate end G of the LDMOS 132. In another disclosure, the voltage pull-down element 134 is a pull-down transistor. The pull-down transistor is electrically connected between the gate end G of the LDMOS 132 and the ground TGN, and the control end of it is electrically connected to a bias voltage, to decrease the voltage of the gate end G of the LDMOS 132. The voltage pull-down element 134 can be other electronic elements, and the instant disclosure is not limited thereto.

The clamp element 136 is electrically connected between the gate end G and the full bridge circuit 110 for limiting the voltage of the gate end to being above a clamp voltage (not shown in FIGs), so that the voltage difference between the source end S and the gate end G is less than a predefined low voltage, to meet the low voltage characteristic of the LDMOS 132. In the instant disclosure, the clamp element 136 is a zener diode. The zener diode has an anode end and a cathode end. The anode end is electrically connected to the gate end G, and the cathode end is electrically connected to the full bridge circuit 110, to limit the voltage of the gate end G to being above a clamp voltage (e.g., 7V). The clamp element 136 can be other electronic elements, and the instant disclosure is not limited thereto.

In the instant disclosure, the motor MT is single phase motor. The full bridge circuit 110 connected to the motor MT is a single-phase full bridge circuit having two bridge-arms configured in parallel. Two bridge-arms are a first bridge-arm 112 and a second bridge-arm 114 respectively. The number of the driving voltage signals is two. One is a first driving voltage signal OUT1 and the other is a second driving voltage signal OUT2. The first bridge-arm 112 has a first switch SW1 and a second switch SW2. An end of the first switch SW1 is electrically connected to the source end S of the LDMOS 132. Another end of the first switch SW1 is electrically connected to an end of the second switch SW2. Another end of the second switch SW2 is electrically connected to the ground end TGN.

The second bridge-arm 114 has a third switch SW3 and a fourth switch SW4. An end of the third switch SW3 is electrically connected to the source end S of the LDMOS 132. Another end of the third switch SW3 is electrically connected to an end of the fourth switch SW4. Another end of the fourth switch SW4 is electrically connected to the ground end TGN. In the instant disclosure, the first switch SW1 and the third switch SW3 are PMOS. The second switch SW2 and the fourth switch SW4 are NMOS. The first switch SW1, the second switch SW2, the third switch SW3, and the fourth switch SW4 can be other switches, and the instant disclosure is not limited thereto.

The control circuit 120 controls the phase commutation of the full bridge circuit 110 according to the hall signals H+ and H−, i.e., the control circuit 120 generates four control signals C1, C2, C3, and C4 to respectively control the turn-on and turn-off of the first switch SW1, the second switch SW2, the third switch SW3, and the fourth switch SW4 according to the hall signals H+ and H−. The full bridge circuit 110 respectively generates two phase currents to the motor MT through two driving ends TO1 and TO2. Then two driving ends TO1 and TO2 respectively output the first driving voltage signal OUT1 and the second driving voltage signal OUT2. This means that the first driving voltage signal OUT1 is outputted between the first switch SW1 and the second switch SW2, and the second driving voltage signal OUT2 is outputted between the third switch SW3 and the fourth switch SW4, to control the operation of the motor MT. Persons of ordinary skill in this technology field should realize the phase commutation of the full bridge circuit 110 and the operation of the motor MT, so detailed description is omitted.

For another example, the motor MT is a three-phase motor. The full bridge circuit (not shown in FIGs) connected to the motor MT is a three-phase full bridge circuit having three bridge-arms configured in parallel. Persons of ordinary skill in this technology field should realize the inner structures and individual operation of the three-phase full bridge circuit and the control circuit through the full bridge circuit 110 and the control circuit 120, so detailed description is omitted. Accordingly, the control circuit controls the phase commutation of the full bridge circuit according to two hall signals H+ and H−, to further control the operation of the three-phase motor.

Therefore, as shown in FIG. 2, when the supply end TIN receives a power generated from a power line (not shown in FIGs) of a power supply PW and the ground end TGN connects to ground through a ground line (not shown in FIGs) of the power supply PW, the voltage difference between the source end S and the gate end G is more than or equal to a turn-on voltage (e.g., 0V), to turn on the LDMOS 132. The control circuit 120 and the full bridge circuit 110 start to operate after receiving the power. At present, the control circuit 120 controls the phase commutation of the full bridge circuit 110 according to two hall signals H+ and H−, to control the operation of the motor MT. For example, when the power supply PW transmits 12V power to the motor driving circuit 100 through the supply end TIN, the voltage pull-down element 134 decreases the voltage of the gate end G because the voltage pull-down element 134 connects to ground. Then the clamp element 136 limits the voltage of the gate end G to a clamp voltage (e.g., the clamp voltage is 7V). The voltage of the source gate S is slightly less than 12V power (e.g., the voltage of the source end S is 11.9V) because of the parasitic resistance of the LDMOS 132. Therefore, the voltage difference between the source end S and the gate end G (e.g., 11.9V−7V=4.9V) is more than or equal to the turn-on voltage (e.g., 0V) and is less than the predefined low voltage (e.g., 5V). At this time, the LDMOS 132 is turned on (because the voltage difference between the source end S and the gate end G is more than or equal to the turn-on voltage), to meet the low voltage characteristic of the LDMOS 132 (because the voltage difference between the source end S and the gate end G is less than the predefined low voltage).

In addition, as shown in FIG. 3, when the supply end TIN connects to ground through a ground line (not shown in FIGs) of the power supply PW, and the ground end TGN receives a power generated from a power line (not shown in FIGs) of the power supply PW, the voltage difference between the source end S and the gate end G is less than a turn-on voltage (e.g., 0V), to turn off the LDMOS 132. The control circuit 120 and the full bridge circuit 110 stop operating because of the lack of power. For example, when the power supply PW transmits 12V power to the motor driving circuit 100 through the ground end TGN, the voltage pull-down element 134 increases the voltage of the gate end G (e.g., the voltage of the gate end G is 12V) because of receiving 12V power. The voltage source end S is less than 12V power (e.g., the voltage of source end S is 11V) because of the parasitic resistances of the first switch SW1, the second switch SW2, the third switch SW3, and the fourth switch SW4. Therefore, the voltage difference between the source end S and the gate end G (e.g., 11V−12V=−1V) is less than the turn-on voltage (e.g., 0V) and is less than the predefined low voltage (e.g., 5V). At this time, the LDMOS 132 is turned off (because the voltage difference between the source end S and the gate end G is less than the turn-on voltage), to meet the low voltage characteristic of the LDMOS 132 (because the voltage difference between the source end S and the gate end G is less than the predefined low voltage).

Accordingly, when a power line and a ground line of the power supply electrically and respectively connect to the supply end TIN and the ground end TGN (i.e., the motor driving circuit 100 operates in a correct connection status), the reversal protection circuit 130 is turned on, so that the internal elements of the motor driving circuit 100 receive the power transmitted from the power supply to operate. When the power line and the ground line of the power supply electrically and respectively connect to the ground end TGN and the supply end TIN (i.e., the motor driving circuit 100 operates in an incorrect connection condition), the reversal protection circuit is turned off, so that the internal elements of the motor driving circuit 100 do not receive the power transmitted from the power supply. At this time, because the LDMOS 132 of the reversal protection circuit 130 is turned off in the incorrect connection condition, the motor driving circuit 100 does not burn out the power supply. Therefore, the life time of the power supply can be increased.

In addition, the motor driving circuit 100 further includes an electro-static discharge (ESD) protection circuit 140. The ESD protection circuit 140 electrically connects the reversal protection circuit 130, the full bridge circuit 110, and the control circuit 120, to lead an electrostatic discharge current flowing through the reversal protection circuit 130, the full bridge circuit 110, or the control circuit 120 into ground, to avoid burning out the interval element of the motor driving circuit 100 because of the ESD. In the instant disclosure, the ESD protection circuit 140 is a discharge transistor, the drain of the discharge transistor is electrically connected to the reversal protection circuit 130, the full bridge circuit, and the control circuit 120. The source of the discharge transistor is connected to ground, and the gate of the discharge transistor is connected to ground. The ESD protection circuit 140 can be other electronic elements, and the instant disclosure is not limited thereto.

It is worth to note that, in the same structure, the chip area of the motor driving circuit 100 with the reversal protection circuit 130 is larger than the chip area of the conventional motor driving circuit without the reversal protection circuit 130. Therefore, the motor driving circuit 100 has better ESD capability.

Figure 4:
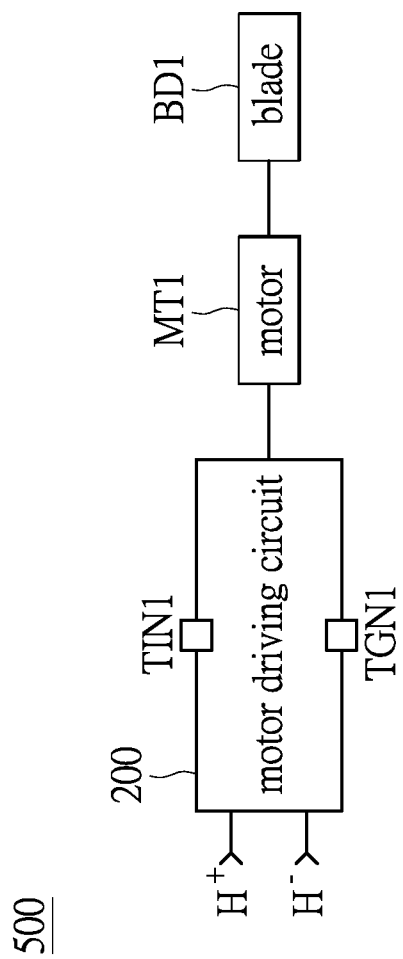
FIG. 4 shows a block diagram of a fan device according to an exemplary embodiment of the instant disclosure.

Next, please refer to FIG. 4, which shows a block diagram of a fan device according to an exemplary embodiment of the instant disclosure. As shown in FIG. 4, the fan device 500 has a blade BD1, a motor MT1, and a motor driving circuit 200. The blade BD1 is configured on the motor MT1 and the motor MT1 drives the blade BD1 to rotate. The motor driving circuit 200 is electrically connected to the motor MT to drive the motor MT1 according to two hall signals H+ and H−. With respect to internal elements and operations of the motor driving circuit 200, they are the same as that of the motor driving circuit 100, so detailed description is omitted.

Therefore, when a power line and a ground line of the power supply electrically and respectively connect to the supply end TIN1 and the ground end TGN1 (i.e., the motor driving circuit 200 operates in a correct connection status), the internal elements of the motor driving circuit 200 receive the power transmitted from the power supply to operate. When the power line and the ground line of the power supply electrically and respectively connect to the ground end TGN1 and the supply end TIN1 (i.e., the motor driving circuit 200 operates in an incorrect connection condition), the internal elements of the motor driving circuit 200 do not receive the power transmitted from the power supply. In addition, the motor driving circuit 200 does not burn out the power supply in the incorrect connection condition. Therefore, the life time of the power supply can be increased.

In summary, the invention is to provide a motor driving circuit with power reversal protection and a fan device. A reversal protection circuit is configured in the motor driving circuit. Therefore, when a power line and a ground line of the power supply are connected reversely, the reversal protection circuit configured in the motor driving circuit provides a protection mechanism to avoid burning out the power supply. Therefore, the life time of the power supply can be increased.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A motor driving circuit with power reversal protection, adapted for driving a motor, and the motor driving circuit comprising:
   a full bridge circuit, electrically connected between the motor and a ground end;
   a control circuit, electrically connected to the full bridge circuit, and configured for controlling the phase commutation of the full bridge circuit according to two hall signals, to generate a plurality of driving voltage signals in the full bridge circuit and to accordingly control the operation of the motor; and
   a reversal protection circuit, electrically connected among a supply end, the full bridge circuit, and the control circuit, and the reversal protection circuit comprising:
   a LDMOS, having a drain end, source end, and a gate end, the drain end electrically connected to the supply end, and the source end electrically connected to the full bridge circuit;
   a voltage pull-down element, electrically connected between the gate end and the ground end, and used for decreasing the voltage of the gate end; and
   a clamp element, electrically connected between the gate end and the full bridge circuit, and used for limiting the voltage of the gate end to being above a clamp voltage, so that the voltage difference between the source end and the gate end is less than a predefined low voltage;
   wherein when the supply end is connected to ground through a ground line of a power supply and the ground end receives a power generated from a power line of the power supply, the voltage difference between the source end and the gate end is less than a turn-on voltage, to turn off the LDMOS.

2. The motor driving circuit according to claim 1, wherein when the supply end receives the power generated from the power line of the power supply and the ground end is connected to ground through the ground line of the power supply, the voltage difference between the source end and the gate end is more than or equal to the turn-on voltage, to turn on the LDMOS.

3. The motor driving circuit according to claim 1, wherein the clamp element is a zener diode, the zener diode has an anode end and a cathode end, the anode end is connected to the gate end, and the cathode end is connected to the full bridge circuit.

4. The motor driving circuit according to claim 1, wherein the voltage pull-down element is a resistor, a transistor switch, or a pull-down transistor.

5. The motor driving circuit according to claim 1, wherein the control circuit electrically connects a hall sensor, the hall sensor detects the magnetic field change of the motor and accordingly outputs the two hall signals to the control circuit, wherein the two hall signals are opposite.

6. The motor driving circuit according to claim 1, further comprising an electrical static discharge (ESD) protection circuit, wherein the ESD electrically is connected to the reversal protection circuit, the full bridge circuit, and the control circuit, to lead an electrostatic discharge current flowing through the reversal protection circuit, the full bridge circuit, or the control circuit into ground.

7. The motor driving circuit according to claim 6, wherein the ESD protection circuit is a discharge transistor, the drain of the discharge transistor is electrically connected to the reversal protection circuit, the full bridge circuit, and the control circuit, the source of the discharge transistor is connected to ground, and the gate of the discharge transistor is electrically connected to the source of the discharge transistor.

8. The motor driving circuit according to claim 1, wherein the driving voltage signals are composed of a first driving voltage signal and a second driving voltage signal, and the full bridge circuit comprising:
   a first bridge-arm, having a first switch and a second switch, an end of the first switch is electrically connected to the source end of the LDMOS, another end of the first switch is electrically connected to an end of the second switch, and another end of the second switch is connected to the ground end; and
   a second bridge-arm, having a third switch and a fourth switch, an end of the third switch is electrically connected to the source end of the LDMOS, another end of the third switch is electrically connected to an end of the fourth switch, and another end of the fourth switch is electrically connected to the ground end;

wherein the first driving voltage signal is outputted between the first switch and the second switch, and the second driving voltage signal is outputted between the third switch and the fourth switch.

9. The motor driving circuit according to claim 8, wherein the first switch and the third switch are PMOS, and the second switch and the fourth switch are NMOS.

10. A fan device, comprising:

a blade;

a motor, configuring the blade, and driving the blade to rotate;

a motor driving circuit, electrically connected to the motor, and comprising:

a full bridge circuit, electrically connected between the motor and a ground end;

a control circuit, electrically connected to the full bridge circuit, and configured for controlling the phase commutation of the full bridge circuit according to two hall signals, to generate a plurality of driving voltage signals in the full bridge circuit and to accordingly control the operation of the motor; and a reversal protection circuit, electrically connected among a supply end, the full bridge circuit, and the control circuit, and the reversal protection circuit comprising:

a LDMOS, having a drain end, source end, and a gate end, the drain end electrically connected to the supply end, and the source end electrically connected to the full bridge circuit;

a voltage pull-down element, electrically connected between the gate end and the ground end, and used for decreasing the voltage of the gate end; and a zener diode, having an anode end and a cathode end, the anode end connected to the gate end, and the cathode end connected to the full bridge circuit, and the zener diode used for limiting the voltage of the gate end to being above a clamp voltage, so that the voltage difference between the source end and the gate end is less than a predefined low voltage;

wherein when the supply end is connected to ground through a ground line of a power supply and the ground end receives a power generated from a power line of the power supply, the voltage difference between the source end and the gate end is less than a turn-on voltage, to turn off the LDMOS.

11. The fan device according to claim 10, wherein when the supply end receives the power generated from the power line of the power supply and the ground end is connected to ground through the ground line of the power supply, the voltage difference between the source end and the gate end is more than or equal to the turn-on voltage, to turn on the LDMOS.

* * * * *